Feb. 23, 1971   B. E. SHLESINGER, JR   3,566,324
TEMPERATURE CHANGING CIRCUIT PROGRAMMING APPARATUS
Original Filed Aug. 10, 1965   3 Sheets-Sheet 1

INVENTOR
*Bernard Edward Shlesinger, Jr.*

BY *Bernard Edward Shlesinger Jr.*

INVENTOR
Bernard Edward Shlesinger, Jr.
BY

United States Patent Office 3,566,324
Patented Feb. 23, 1971

3,566,324
TEMPERATURE CHANGING CIRCUIT
PROGRAMMING APPARATUS
Bernard Edward Shlesinger, Jr., 3906 Bruce Lane,
Annandale, Va. 22003
Original application Aug. 10, 1965, Ser. No. 478,588, now
Patent No. 3,517,166, dated June 23, 1970. Divided and
this application Oct. 17, 1969, Ser. No. 867,220
Int. Cl. G06k 7/00; H01h 43/08
U.S. Cl. 337—1
13 Claims

ABSTRACT OF THE DISCLOSURE

A thermally responsive programming apparatus for programming electrical devices having a support member, movable means in the support member having heatable and coolable spot portions movable about an axis, a series of sequentially spaced pre-set detectors connected to the electrical devices and arranged in the direction of travel of the movable means and in close proximity to the movable means and each responsive to a specific temperature, independent moving means for moving the movable means at different programming speeds, a spot temperature changing applicator means in close proximity to the support member and remote from the heat detectors for changing the temperature of at least one of the spot portions, the detectors being remote from the temperature changing applicator means so as to be uninfluenced thereby, controlling means independent of the block for controlling the temperature changing applicator means when changing the temperature of the spot portions and whereby upon programmed controlling of at least one of the independent means, the heat detectors by means of the spot portions are selectively caused to operate in a predetermined sequence depending upon the heat transmitted by the spot portions when they are moved in the support member into close proximity with the detectors.

This application is a divisional of U.S. Ser. No. 478,588, filed Aug. 10, 1965, now Pat. No. 3,517,166.

This invention relates improvements in programming systems and the like and in particular to improvements in devices for utilizing a temperature change to operate and control a system or systems of electrical circuits.

Prior art systems for picking up information provide a tape, belt, wire, cable, or the like, to be moved across a device which places information thereon. Subsequently, the belt, or the like, is carried from the place of deposit and conveyed to a position where the information thereon may be taken off or used to perform a certain function.

The present system permits the recording of information on a tape or the like which remains thereon only for a relatively short period of time due to automatic wash-out.

It is an object of this invention to provide a programming system which operates switches or circuits or the like, which is simple in construction, readily adaptable for all types of equipment and jobs, and inexpensive in costs and maintenance.

A further object of this invention is to provide a program system which is fast, trouble-free, and interchangeable.

Another object of this invention is to provide a multiple contact switch programming system for use in computing, aircraft, missiles, telemetering, telephony, and the like.

Yet, a further object of this invention is to provide a programming system which can be selectively changed without changing parts.

Still, a further object of this invention is to provide a programming system which can be used in switching arrangements, such as in combination with hot or cold detector switches of the like.

Still, a further object of this invention is to provide a programming system which is capable of being repetitive or discontinuous as desired.

It is a further object of this invention to provide a programming system which may be used to detect changes in temperature, or indirectly any peculiar physical phenomenon.

Another object of this invention is to provide a multiple programming system that will provide a large number of combination arrangements for circuits or the like.

Yet, a further object of this invention is to provide a system which can be used for detecting fires in a remote area, temperature changes in cooking vessels, furnaces, and industrial chemical distillation apparatus and the like.

Yet, a further object of this invention is to provide a system which will detect cold conditions.

Yet, a further object of this invention is to provide a system which will operate a series of circuits by means of a change in temperature whether it be hot or cold and in which a third variable condition can be used to control the operation of the systems such as change in barometric pressure, change in speed of machinery or the like.

GENERAL SUMMARY

This invention relates to a method or apparatus in which a temperature change is caused to occur in a specific area of a movable member while the movable member is in a first position and in which a movable member is moved to a second position wherein a sensing device located in the second position detects the specific temperature change in the area which has been moved to the second position and relays the information to a circuit device in order to affect a change in the circuit.

These and other objects and advantages of this invention will be apparent from the following description and claims.

In the accompanying drawings which illustrate by way of example various embodiments of this invention:

IN THE DRAWINGS

Figure 4:
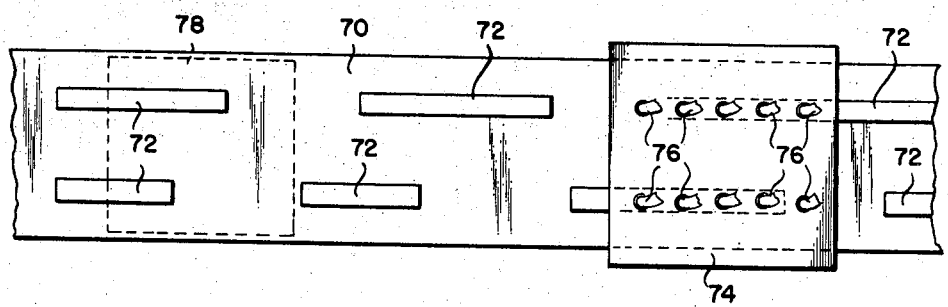
Figure 5:
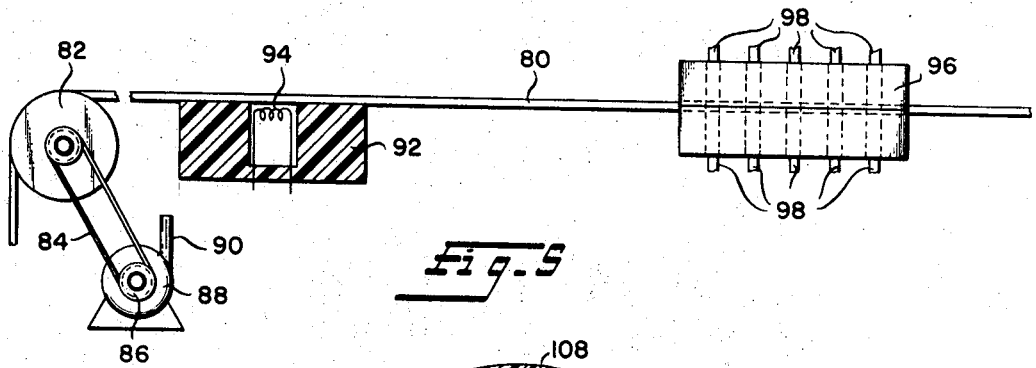
Figure 6:
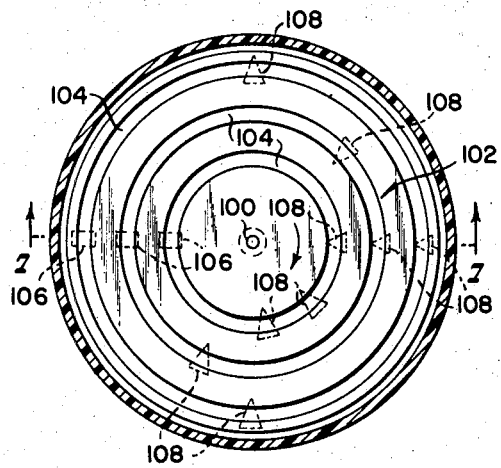
Figure 7:
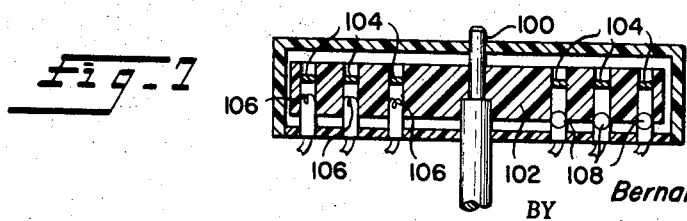
Figure 8:
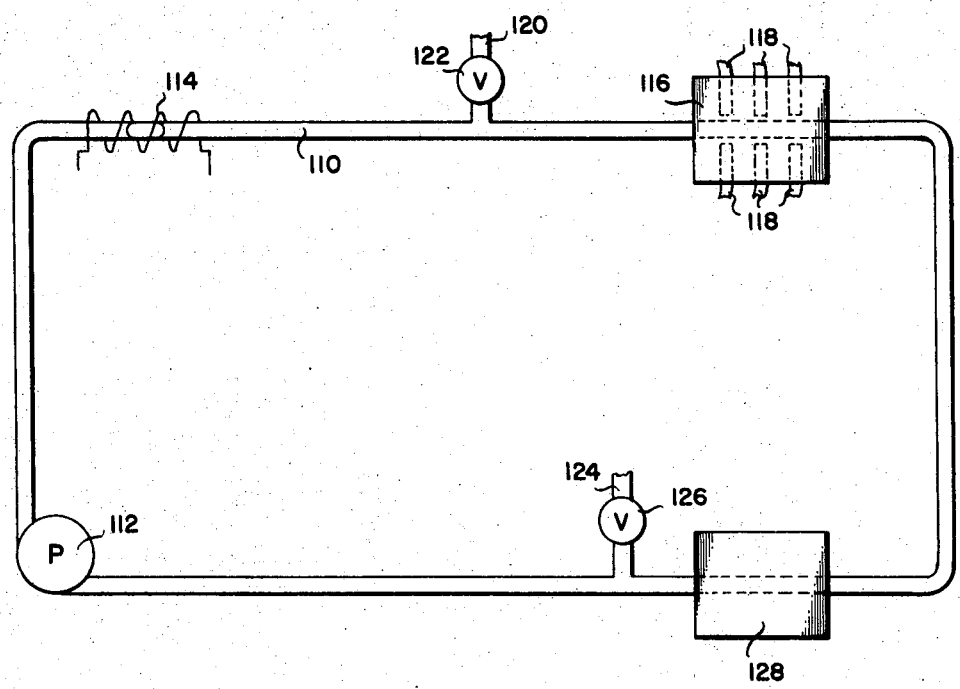
Figure 9:
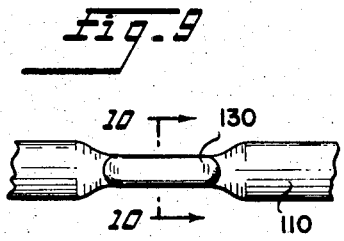
Figure 10:
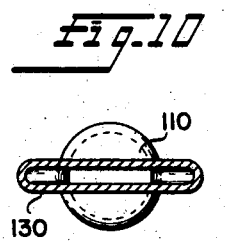

FIIG. 3 is side elevation view diagrammatically illustrating a further embodiment of this invention;

FIG. 4 is a fragmentary top plan view illustrating yet a further embodiment of this invention;

FIG. 5 is a side elevational view illustrating another embodiment of this invention;

FIG. 6 is a top plan view with the cover removed illustrating yet a further embodiment of this invention;

FIG. 7 is a cross sectional view taken along the lines 7—7 of FIG. 6 shown with the cover in place;

FIG. 8 is a schematic diagram illustrating yet another embodiment of this invention;

FIG. 9 is a fragmentary side elevational view of a portion of the tubing adjacent the heating area as would be used in the system illustrated in FIG. 8;

FIG. 10 is a cross sectional view taken along the lines 10—10 in FIG. 9.

FIGS. 1 THROUGH 5

Figure 1:
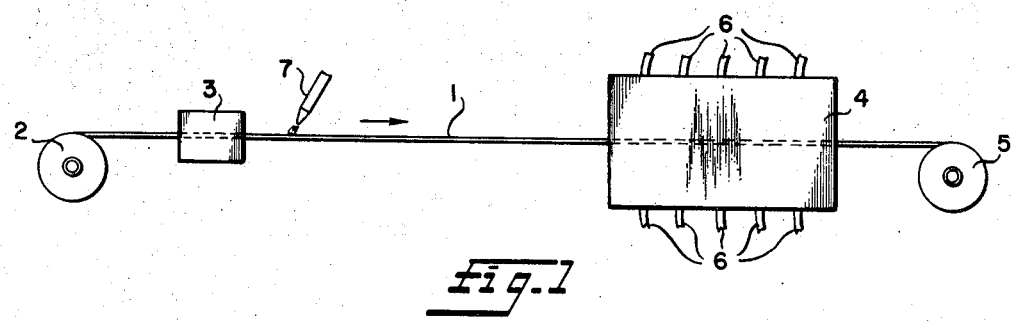
FIG. 1 is side elevation view diagrammatically showing one embodiment of this invention.

In FIG. 1 a wire, rope, cable, or tape-like member is played from a spool 2, through or adjacent a temperature changing applicator 3 and thence to a sensor block 4 and thereafter to a wind-up reel or spool 5. A series of circuits are connected to the block 4 by means of leads 6.

The reeling and winding mechanisms 2 and 5 are operated through a drive mechanism (not shown).

The belt 1 may be a flat strip, a wire, a tape, or a band. It may be conductive or nonconductive or portions may be conductive and nonconductive or portions may be conductive and nonconductive. Member 3 which is the device for producing a temperature differential on the cable 1 may be any type of heating element or cooling element as desired. The heating element 3 may be a coil or burner device as desired. If the device is a cooling element, the cooling element may be a refrigerated coil which may be brought into and out of engagement with the belt 1. A freezing solution may be utilized and sprayed at intervals on the cable or belt 1 by means of a nozzle 7 as illustrated in FIG. 1.

The arrangement shown in FIG. 1 illustrates how a heating element at 3 may be used in conjunction with a cooling element such as 7 for alternately heating and cooling various portions of cable 1 as desired. The sensors 6 which may be thermostatic controlled switches or thermistors or the like, may be selectively or alternately arranged to sense heat or cold differentials in the cable 1.

The block 4 which includes the various sensing devices 6 can be arranged to include as many as desired.

The reels 2 and 5 may be replaced by pulleys (not shown) and the belt or cable 1 may be endless to permit continued rotation.

Means for operating either of the thermal change devices such as 3 and 7 are not shown. But control means such as a switch mechanism or valve mechanism may be used to either manually or automatically control the amount of heat input or cold output from the devices 3 and 7 for the period of time desired whether intermittently or continuously.

Figure 2:
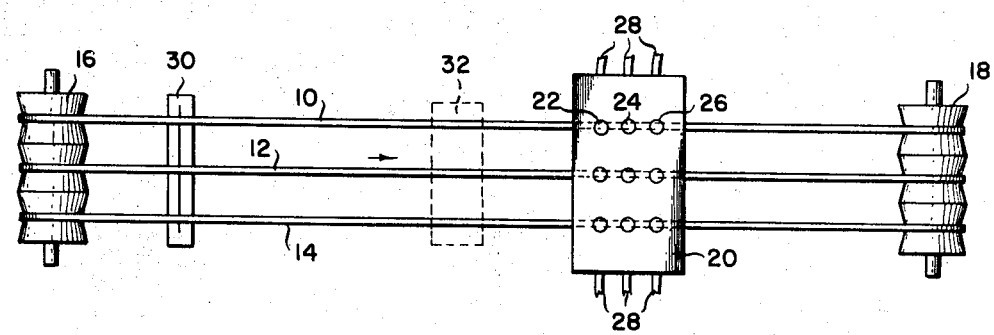
FIG. 2 is top plan view diagrammatically illustrating another embodiment of this invention.

In FIG. 2, a series of belts 10, 12, and 14 are moved by drive means (not shown). The belts 10, 12 and 14 may be endless and guided on pulleys 16 and 18. Any number of belts may be provided as desired.

The block 20 may contain any number of sensors 22, 24 and 26 as desired. The sensors for each belt should be linearly arranged for reasons hereafter set out. A series of leads 28 are connected to various circuits (not shown) for programming as hereinafter set out.

A temperature changing element 30 is provided to operate on all three belts 10, 12 and 14 as illustrated. The member 30 is so designed as to operate on all simultaneously though it may be so designed as to operate individually on each one and selectively as desired through a switch mechanism (not shown). Where the operating temperature changing device 30 runs continuously, a negator device 32 is positioned in advance of the block 20 so as to selectively cancel out the temperature change made in the belt by the element 30. The negator 32 may be so designed as to selectively heat or cool any of the belts individually or simultaneously.

Any means desired may be used to drive the pulleys 16 and 18 at any selected speed as required for a programming sequence.

Figure 3:
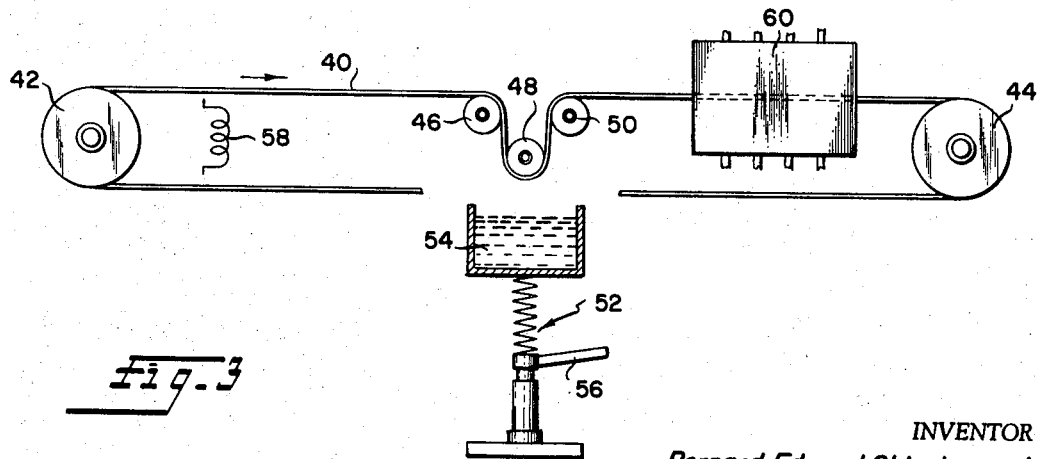

In FIG. 3, the belt 40 is driven by a motor mechanism (not shown) attached to one of the pulleys 42 and 44.

Idling pulleys 46, 48 and 50 change the course of the belt 40 to bring a small area into close engagement with a negator system 52. In FIG. 3 the negator system comprises a bath 54 which may include either a hot or cold liquid. The bath is controlled through a raising and lowering mechanism 56 so as to be brought into engagement with the belt 40 for periods of time as desired. If the heating element or cooling element 58 is run continuously, cooling or heating may be adjusted or varied as desired by means of the adjustment or control mechanism 56. Moving the bath 54 into and out of engagement with the belt 40 will cancel out any change which may have been impressed thereon to permit programming as desired in the program system block 60.

In FIG. 4, the tape or belt 70 is web-like and has a series of heat or cold sensitive members therein such as 72 which may be of varying lengths. The member 72 may be foil-like so as to readily pick up a change of temperature whether it be from a heating element or a refrigerating element. The ability for the foil which may be metal or plastic to rapidly dissipate the heat or cold which has been picked up is important from the standpoint of operability of the programming block 74 with its various sensors 76. The belt 70 passes over a temperature changing applicator generally shown in phantom lines as at 78. The applicator may be similar to any previously described herein.

The width of the belt or tape 70 may be selected as determined by the number of heat or cold sensitive areas such as 72.

In FIG. 5, the belt, wire, or cable 80 may be endless or wound upon a reel. In FIG. 5 the belt passes over a pulley 82 which is driven by a pulley drive belt 84 connected to a motor shaft 86 of the motor 88. The speed of the motor is controlled by a barometric switching mechanism 90 of a type well known in the art. The cable 80 is moved across the temperature applicator block 92 which as illustrated in FIG. 5 contains a heating coil element 94. A refrigerating element may be provided if desired. The heating or cooling elements may be interchangeable. The belt 80 which has undergone a temperature change in certain portions thereof moves through the block 96 and the sensors 98 pick up any temperature change according to the sensitivity as calibrated for the desired programming arrangement. A negating or temperature cancelling system such as illustrated in FIGS. 3 or 2 may be utilized if desired.

OPERATION OF THE DEVICES ILLUSTRATED IN FIGS. 1 THROUGH 5

In general, the systems illustrated in FIGS. 1 through 5 operate in much the same manner. The cable, wire, belt, or web, are moved at a predetermined speed through the heating block or cooling block thereby causing temperature changes to occur in various desired locations on the belt or web or wire as the case may be. If the cable or the like is moving at a constant speed, the heat or cold accumulated thereon gradually dissipates as the belt or web moves away from the source of temperature supply and passes into close proximity to the sensor devices. The sensors closest to the source of temperature change will pick up the temperature change and activate a switch or the like. If the heat, for example, in the belt is dissipating rapidly, there may not be sufficient heat to activate a second sensor which is linearly in line with the first sensor. If, however, the speed of the belt or cable is increased, the temperature in the web which has been induced will not dissipate fast enough and therefore the first two sensors will be activated. Similarly, all of the sensors which are axially aligned will pick up in sequence as the speed of the belt is increased. This, of course, assumes that the sensors are all calibrated to react at the same temperature. The sensors of course, may be calibrated for different temperatures and may so be designed as to operate at any desired temperature. Thus, if the belt were travelling slowly and the temperature is too low to operate the first in line sensor, it may be sufficient to operate the second in line sensor, etc. In a case of FIG. 1, certain areas may be kept cool while others are kept warm and thus the belt may convey sensing information receptive to both hot and cold sensors. In FIGS. 2 and 4, multiple information can be stored for a period of time depending upon the amount of dissipation of the change which has occurred. By utilizing foil in the areas of direct contact with the heating element, the dissipation of heat or in a case of a cooling element, cold, may be rapid and accurate. In the case of the development illustrated in FIG. 5, the barometric control may be used, for example, in chemical industrial applications where the barometric pressure must remain a constant. For example if the barometeric pressure goes up, the belt 80 might be slowed in speed as required. A series of circuits which may be operating through the sensors 98. As the speed increases due to pressure drop, other sensors will be activated and make the necessary circuit changes required.

It will be obvious that varios temperature and pressure systems may be used for controlling different types of machines, systems, or processes such as in the manufacture of chemicals, petroleum products, iron and steel, etc. The belts, tapes, or wires 1, 10, 12 and 14, 40, 70 and 80 may be designed to have a long lasting heat or cold sink. Similarly, with various materials, the heat or cold may be dissipated rapidly as, for example, with the use of foil as set out above. All of these factors will have a relationship on the programming of the circuits controlled through the blocks such as 4, 20, 60, 74 and 96.

FIGS. 6 AND 7

From the standpoint of basic operation, the device illustrated in FIGS. 6 and 7 works on the same principles. The device is carried by means of a rotary shaft 100. The shaft 100 carries a rotating platform or table 102. The table 102 has a series of heat sensitive members 104. The members 104 may also be cold sensitive as heretofore described.

The heating elements 106 cause the plate or table 102 to heat up in the areas of the heat sensitive rings or elements 104. Spaced from the heating elements 106 are sensors 108. The sensors 108 may be spaced along their respective ring 104 at any programmed selection interval as determined prior to operation.

It will be obvious that any number of rings can be provided in the system and that a negating system can be used if necessary whereby the plate or disc 102 will pass a temperature cancelling device. A coolant bath or blast of either hot or cold air or a warming bath etc. may be utilized as heretofore described.

OPERATION OF FIGS. 6 AND 7

In the operation of the device illustrated in FIGS. 6 and 7, the heating or cooling elements, as the case may be, 106 effect a temperature change to the strips or foil circular rings 104 in localized areas. As the disc 102 rotates, the heat or cold, as the case may be, will dissipate to return to the formal room temperature. The sensors placed at various intervals will pick up the information placed on the strip and react accordingly. If the heat, as for example, is rapidly dissipating because of the slow speed of the disc, the sensors will not operate. If the rotation of the disc is increased, the sensors will operate due to the fact that the heated area gets to the sensors faster than the heat dissipates threrefrom.

FIGS. 8, 9 AND 10

In FIGS. 8, 9 and 10, we have a different arrangement which operates basically on the same principle. In FIG. 8 a conduit 110 carries a fluid which may be mercury, water, air, or the like. A pump is used as at 112 to circulate the fluid through the closed system. As the pump circulates the fluid, a heating or cooling element changes the temperature of that portion of the fluid which passes in proximity to the temperature change applicator 114. As the fluid moves along, certain portions are heated or cooled as desired. This may require the turning on and off of the heating or cooling element or the moving of it into or out of the area of the conduit in order to avoid heating or cooling as the case may be. The slug of fluid which has been heated or cooled is moved in a circulating fashion through the conduit 110 and through the block 116'. Sensors 118 calibrated to the temperature desired operate circuits (not shown) when the passing fluid is at a temperature sufficient to be sensed by the sensor. The system is shown containing an input pipe 120 having a valve 122 and a take-off pipe 124 having a valve 126. If it is necessary to correct the temperature of the fluid, the valve 122 may be gated to permit additional fluid to enter therein so as to mix and cause a temperature change in the direction desired. The output pipe 124 with the valve 126 allows for balancing of the pressure in the system.

Depending upon the speed of the fluid in the system, it may be essential to have a temperature balancing apparatus as at 128. This apparatus will be so designed as to return the fluid to room temperature during a single cycling thereof.

In order to assure that a rapid temperature change can be imparted to the fluid, a flash chamber in the tubing or conduit 110 is provided adjacent a temperature change applicator 114. In this instance, the tubing 110 is flattened as at 130 in order to provide a greater surface area which may be heated or cooled rapidly by the mechanism such as a heating coil, or the like.

OPERATION OF THE DEVICE ILLUSTRATED IN FIGS. 8, 9 AND 10

In the device illustrated in FIG. 8, the fluid is moved by means of a pump 112 across the temperature applicator and into the sensor block. Control of the various sensors is done by means of regulating the fluid in the system and regulating the amount of negating necessary through the valve 122.

It will be obvious that the system can be connected to a barometric or other type of control as previously mentioned with the previously described apparatus.

While the invention has been described, it will be understood that it is capable of further modifications and this application is intended to cover any variations, uses, or adaptations of the invention following in general, the principles of the invention and including such departures from the present disclosure as some within known or customary practice in the art to which the invention pertains, and as may be applied to the essential features hereinbefore set forth and as fall within the scape of the invention or the limits of the appended claims.

What is claimed is:

1. A thermally responsive programming apparatus for programming electrical devices comprising:
   (a) a support member
   (b) rotatable movable means in said support member having heatable and coolable spot portions movable about an axis
   (c) a series of sequentially spaced pre-set heat detectors connected to said electrical devices and arranged in the direction of travel of said movable means and in close proximity to said movable means and each responsive to a specific temperature
   (d) independent moving means for moving said movable means at different programming speeds
   (e) a spot temperature changing applicator means in close proximity to said support member and remote from said heat detectors for changing the temperature of at least one of said spot portions
   (f) said detectors being remote from said temperature changing applicator means so as to be uninfluenced thereby
   (g) controlling means independent of said detectors for controlling said temperature changing applicator means when changing the temperature of said spot portions
   (h) whereby upon programmed controlling of at least one of said independent means, said heat detectors by means of said spot portions are selectively caused to operate in a predetermined sequence depending upon the heat transmitted by said spot portions when they are moved in said support member into close proximity with said detectors.

2. A thermally responsive programming apparatus as in claim 1 and wherein:
   (a) said rotatable movable means is a rotatable disc.

3. A thermally responsive programming apparatus as in claim 2 and wherein:
   (a) said spot portions of said disc each include an annular concentric strip
   (b) at least one of said spot temperature changing apparatus means for each of said annular strips
   (c) at least one series of said sequentially spaced pre-set heat detectors for each of said annular strips, and
   (d) said controlling means including means for controlling each of said spot heaters.

4. A thermally responsive programming apparatus as in claim 1 and wherein:
   (a) said spot temperature changing applicator means is a heater.

5. A thermally responsive programming apparatus as in claim 1 and wherein:
   (a) said spot temperature changing applicator means is a cooler.

6. A thermally responsive programming apparatus as in claim 1 and including:
   (a) a second temperature changing applicator means in series with said first mentioned temperature changing applicator means for reducing the effects of said first mentioned temperature changing applicator means.

7. A thermally responsive programming apparatus for programming electrical devices comprising:
   (a) a support member
   (b) fluid in said support member having heatable and coolable spot portions movable about an axis
   (c) a series of sequentially spaced pre-set heat detectors connected to said electrical devices and arranged in the direction of travel of said fluid and in close proximity to said fluid and each responsive to said specific temperature
   (d) independent moving means for moving said fluid at different programming speeds
   (e) a spot temperature changing applicator means in close proximity to said support member and remote from said heat detectors for changing the temperature of at least one of said spot portions
   (f) said detectors being remote from said temperature changing applicator means so as to be uninfluenced thereby
   (g) controlling means independent of said detectors for controlling said temperature changing applicator means when changing the temperature of said spot portions
   (h) whereby upon programmed controlling of at least one of said independent means, said heat detectors by means of said spot portions are selectively caused to operate in a pre-determined sequence depending upon the heat transmitted by said spot portions when they are moved in said support member into close proximity with said detectors.

8. A thermally responsive programming apparatus as in claim 7 and wherein:
   (a) said support member includes a fluid conduit having a closed loop.

9. A thermally responsive programming apparatus as in claim 8 and wherein:
   (a) said support member includes a flash chamber.

10. A thermally responsive programming apparatus as in claim 9 and wherein:
    (a) said independent moving means includes a pump.

11. A thermally responsive programming apparatus as in claim 10 and wherein:
    (a) said fluid conduit includes switching means.

12. A thermally responsive programming apparatus as in claim 7 and including:
    (a) a second temperature changing applicator means in series with said first mentioned temperature changing applicator means for reducing the effects of said first mentioned temperature changing applicator means.

13. A thermally responsive programming apparatus as in claim 12 and wherein:
    (a) said movable means is a fluid
    (b) said support member includes a fluid conduit having a closed loop, and
    (c) said second temperature changing applicator means includes a fluid injection line for said closed loop for injecting fluid into said loop of a different temperature from that in said loop so as to modify the temperature of the fluid in said loop.

References Cited

UNITED STATES PATENTS

| | | | |
|---|---|---|---|
| 1,765,955 | 6/1930 | Von Maltitz et al. | 263—3 |
| 3,270,960 | 9/1966 | Phillips | 235—61.117UX |
| 3,299,255 | 1/1967 | Bauer | 235—61.117X |
| 3,355,156 | 11/1967 | Hanna | 263—15B(X) |
| 3,447,105 | 5/1969 | Shlesinger, Jr. | 335—79 |

BERNARD A. GILHEANY, Primary Examiner

D. M. MORGAN, Assistant Examiner

U.S. Cl. X.R.

235—61.11